(12) United States Patent
Yeh

(10) Patent No.: US 8,417,909 B2
(45) Date of Patent: Apr. 9, 2013

(54) BLOCK MANAGEMENT AND DATA WRITING METHOD, AND FLASH MEMORY STORAGE SYSTEM AND CONTROLLER USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 331 days.

(21) Appl. No.: 12/703,523

(22) Filed: Feb. 10, 2010

(65) Prior Publication Data

US 2011/0161564 A1 Jun. 30, 2011

(30) Foreign Application Priority Data

Dec. 30, 2009 (TW) .............................. 98145812 A

(51) Int. Cl.
*G06F 12/00* (2006.01)
(52) U.S. Cl.
USPC ............................ 711/170; 711/103; 711/167
(58) Field of Classification Search .................. 711/103, 711/167, 170
See application file for complete search history.

(56) References Cited

U.S. PATENT DOCUMENTS

| 2008/0104309 A1* | 5/2008 | Cheon et al. ................. 711/103 |
| 2008/0120488 A1* | 5/2008 | Woo et al. ..................... 711/209 |
| 2009/0248965 A1* | 10/2009 | Lee et al. ...................... 711/103 |
| 2010/0169544 A1* | 7/2010 | Eom et al. ..................... 711/103 |

FOREIGN PATENT DOCUMENTS

| CN | 1914689 | 2/2007 |
| CN | 101458956 | 6/2009 |

OTHER PUBLICATIONS

First Office Action of China Counterpart Application, issued on Feb. 28, 2012, p. 1-p. 5.

* cited by examiner

*Primary Examiner* — Reginald Bragdon
*Assistant Examiner* — Gurtej Bansal
(74) *Attorney, Agent, or Firm* — J.C. Patents

(57) ABSTRACT

A block management method for managing a plurality of physical blocks is provided. The method includes grouping the physical blocks into a plurality of physical units, grouping a portion of the physical units into a data area and a spare area, configuring a plurality of logical units, and grouping the logical units into a plurality of logical unit groups and configuring another portion of the physical units as a plurality of global random physical units corresponding to the logical unit groups, wherein each of the global random physical units corresponds to one of the logical unit groups. The method further includes getting the physical units from the spare area as global random substitute physical units of the global random physical units. Accordingly, the method can store data in the global random physical units or the global random substitute physical units, thereby reducing the time for executing a host write command.

6 Claims, 10 Drawing Sheets

BLOCK MANAGEMENT AND DATA WRITING METHOD, AND FLASH MEMORY STORAGE SYSTEM AND CONTROLLER USING THE SAME

CROSS-REFERENCE TO RELATED APPLICATION

This application claims the priority benefit of Taiwan application serial no. 98145812, filed on Dec. 30, 2009. The entirety of the above-mentioned patent application is hereby incorporated by reference herein and made a part of this specification.

BACKGROUND OF THE INVENTION

1. Field of the Invention

The present invention relates to a block management method and a data writing method for flash memory, and a flash memory storage system and a flash memory controller using the same.

2. Description of Related Art

Along with the widespread of digital cameras, cell phones, and MP3 in recently years, the consumers' demand to storage media has increased drastically. Flash memory is one of the most adaptable memories for such battery-powered portable products due to its characteristics such as data non-volatility, low power consumption, small volume, and non-mechanical structure. A flash disc is a storage apparatus adopting NAND flash memory as storage medium. Flash memory has been broadly used for storing important personal data thanks to its small volume and large capacity. Therefore, the flash memory industry has become a very important part of the electronic industry in recent years.

In general, flash memory is composed of a plurality of physical blocks. A controller of a flash memory storage system groups the physical blocks into a plurality of physical units and groups the physical units into a data area and a spare area for management. The physical units belonging to the data area are used for storing valid data written by a write command, and the physical units belonging to the spare area are used for replacing the physical units of the data area during the execution of the write command. To enable the host system to properly access the physical units that store data in an alternate mechanism, the flash memory storage system provides logical units to the host system. That is, the flash storage system may establish a logical unit-physical unit mapping table, and record and update mapping relationships between the logical addresses and the physical blocks in the data area in the logical unit-physical unit mapping table to reflect the alternation of the physical units. More specifically, when the flash memory storage system receives the write command from the host system to write data into a logical unit, the flash memory storage system gets one physical unit from the spare area, and copies valid data stored in a physical unit originally mapped to the logical unit and the new data into the physical unit gotten from the spare area. Further, the flash memory storage system performs an erasing operation on the physical unit originally mapped to the logical unit and associate the erased physical unit with the spare area, and re-maps the logical unit to the physical unit storing the new data in the logical unit-physical unit mapping table (i.e., the physical unit storing the new data is associated with the data area). Thus, the host system simply accesses data based on the logical units while the flash memory storage system reads data from or writes data into the mapped physical unit according to the logical unit-physical unit mapping table.

However, the capacity of each physical block becomes more and more large because of the progress of semiconductor manufacture processes, and thus the time for moving valid data relatively becomes longer and the performance of the flash memory storage system is decreased. In particular, when the flash memory storage system is used as a storage medium for installing a computer operation system, the computer operation system may access data (e.g., a file allocation table) stored in some logical units, frequently. Frequently accessing this kind of small file will cause the time for performing the moving of valid data to become longer. Additionally, the controller of the flash memory storage system needs to frequently organize valid data to release physical units only storing invalid data due to the frequent access. Therefore, how to increase the efficiency of writing data in a flash memory is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The present invention provides a block management method and a data writing method capable of effectively shortening the time for executing the write command.

The present invention provides a flash memory controller capable of effectively shortening the time for executing the write command.

The present invention provides a flash memory storage system controller capable of effectively shortening the time for executing the write command.

According to an exemplary embodiment of the present invention, a block management method for managing a plurality of physical blocks of a flash memory chip is proposed. The block management method includes grouping the physical blocks into a plurality of physical units, grouping a portion of the physical units into a data area and a spare area, and configuring a plurality of logical units, wherein each of the logical units maps to one of the physical units of the data area. The block management method also includes grouping the logical units into a plurality of logical unit groups and configuring another portion of the physical units as a plurality of global random physical units corresponding to the logical unit groups, wherein each of the global random physical units corresponds to one of the logical unit groups. The block management method further includes getting at least one of the physical units as at least one global random substitute physical unit corresponding to at least one of global random physical units.

According to an exemplary embodiment of the present invention, a data writing method for writing data from a host system into a plurality of physical blocks of a flash memory chip is proposed. The data writing method includes grouping the physical blocks into a plurality of physical units, grouping a portion of the physical units into a data area and a spare area, and configuring a plurality of logical units, wherein each of the logical units maps to one of the physical units of the data area. The data writing method also includes grouping the logical units into a plurality of logical unit groups and configuring another portion of the physical units as a plurality of global random physical units corresponding to the logical unit groups, wherein each of the global random physical units corresponds to one of the logical unit groups. The data writing method also includes receiving first data, wherein the first data corresponds to a first logical unit among the logical units, the first logical unit belongs to a first logical unit group among the logical unit groups and a first global random physical unit among the global random physical units corresponds to the first logical unit group. The data writing method still includes determining whether the first data is small data and the first logical unit is at an opened mother-child units state. The data writing method also includes determining whether the first global random physical unit is full with data when the first data is small data and the first logical unit is not at the opened mother-child units state. The data writing method further includes getting a physical block from the spare area as a first global random substitute physical unit of the first global random physical unit and temporarily storing the first data into the first global random substitute physical unit when the first global random physical unit is full with data.

According to an exemplary embodiment of the present invention, a flash memory controller for managing a plurality of physical blocks of a flash memory chip is proposed. The flash memory controller includes a microprocessor unit, a flash memory interface unit and a memory management unit. The flash memory interface unit is coupled to the microprocessor unit for coupling to the flash memory chip. The memory management unit is coupled to the microprocessor unit and has a plurality of program codes for providing to the microprocessor unit to perform a plurality of procedures. The microprocessor unit is configured for grouping the physical blocks into a plurality of physical units, grouping a portion of the physical units into a data area and a spare area, and configuring a plurality of logical units, wherein each of the logical units maps to one of the physical units of the data area. Additionally, the microprocessor unit is further operative to group the logical units into a plurality of logical unit groups and configure another portion of the physical units as a plurality of global random physical units corresponding to the logical unit groups, wherein each of the global random physical units corresponds to one of the logical unit groups. Moreover, the microprocessor unit is further operative to get at least one of the physical units as at least one global random substitute physical unit corresponding to at least one of global random physical units.

According to an exemplary embodiment of the present invention, a flash memory controller for managing a plurality of physical blocks of a flash memory chip is proposed. The flash memory controller includes a microprocessor unit, a flash memory interface unit, a host interface unit, and a memory management unit. The flash memory interface unit is coupled to the microprocessor unit for coupling to the flash memory chip. The host interface unit is coupled to the microprocessor unit and configured for coupling to the host system. The memory management unit is coupled to the microprocessor unit and has a plurality of program codes for providing to the microprocessor unit to perform a plurality of procedures. The microprocessor unit is configured for grouping the physical blocks into a plurality of physical units, grouping a portion of the physical units into a data area and a spare area, and configuring a plurality of logical units, wherein each of the logical units maps to one of the physical units of the data area. Additionally, the microprocessor unit is further operative to group the logical units into a plurality of logical unit groups and configure another portion of the physical units as a plurality of global random physical units corresponding to the logical unit groups, wherein each of the global random physical units corresponds to one of the logical unit groups. Moreover, the microprocessor unit is further operative to receive first data, wherein the first data corresponds to a first logical unit among the logical units, the first logical unit belongs to a first logical unit group among the logical unit groups and a first global random physical unit among the global random physical units corresponds to the first logical unit group. And, the microprocessor unit is further operative to determine whether the first data is small data and whether the first logical unit is at an opened mother-child units state, and determine whether the first global random physical unit is full with data when the first data is small data and the first logical unit is not at the opened mother-child units state. Furthermore, the microprocessor unit is further operative to get a physical block from the spare area as a first global random substitute physical unit of the first global random physical unit and temporarily store the first data into the first global random substitute physical unit when the first global random physical unit is full with data.

According to an exemplary embodiment of the present invention, a flash memory storage system is proposed. The flash memory storage system includes a flash memory chip including a plurality of physical blocks and a flash memory controller coupled to the flash memory chip. The flash memory controller is configured for grouping the physical blocks into a plurality of physical units, grouping a portion of the physical units into a data area and a spare area, and configuring a plurality of logical units, wherein each of the logical units maps to one of the physical units of the data area. Additionally, the flash memory controller is further operative to group the logical units into a plurality of logical unit groups and configure another portion of the physical units as a plurality of global random physical units corresponding to the logical unit groups, wherein each of the global random physical units corresponds to one of the logical unit groups. Moreover, the flash memory controller is further operative to get at least one of the physical units as at least one global random substitute physical unit corresponding to at least one of global random physical units.

According to an exemplary embodiment of the present invention, a flash memory storage system is proposed. The flash memory storage system includes a flash memory chip including a plurality of physical blocks, a connector for coupling to a host system and a flash memory controller coupled to the flash memory chip and the connector. The flash memory controller is configured for grouping the physical blocks into a plurality of physical units, grouping a portion of the physical units into a data area and a spare area, and configuring a plurality of logical units, wherein each of the logical units maps to one of the physical units of the data area. Additionally, the flash memory controller is further operative to group the logical units into a plurality of logical unit groups and configure another portion of the physical units as a plurality of global random physical units corresponding to the logical unit groups, wherein each of the global random physical units corresponds to one of the logical unit groups. Moreover, the flash memory controller is further operative to receive first data, wherein the first data corresponds to a first logical unit among the logical units, the first logical unit belongs to a first logical unit group among the logical unit groups and a first global random physical unit among the global random physical units corresponds to the first logical unit group. And, the flash memory controller is further operative to determine whether the first data is small data and whether the first logical unit is at an opened mother-child units state, and determine whether the first global random physical unit is full with data when the first data is small data and the first logical unit is not at the opened mother-child units state. Furthermore, the flash memory controller is further operative to get a physical block from the spare area as a first global random substitute physical unit of the first global random physical unit and temporarily store the first data into the first global random substitute physical unit when the first global random physical unit is full with data.

As described above, the exemplary embodiment of the present invention is capable of effectively reducing the number of times for moving valid data and the number of times for organizing valid data, thereby shortening the time for executing a write command.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
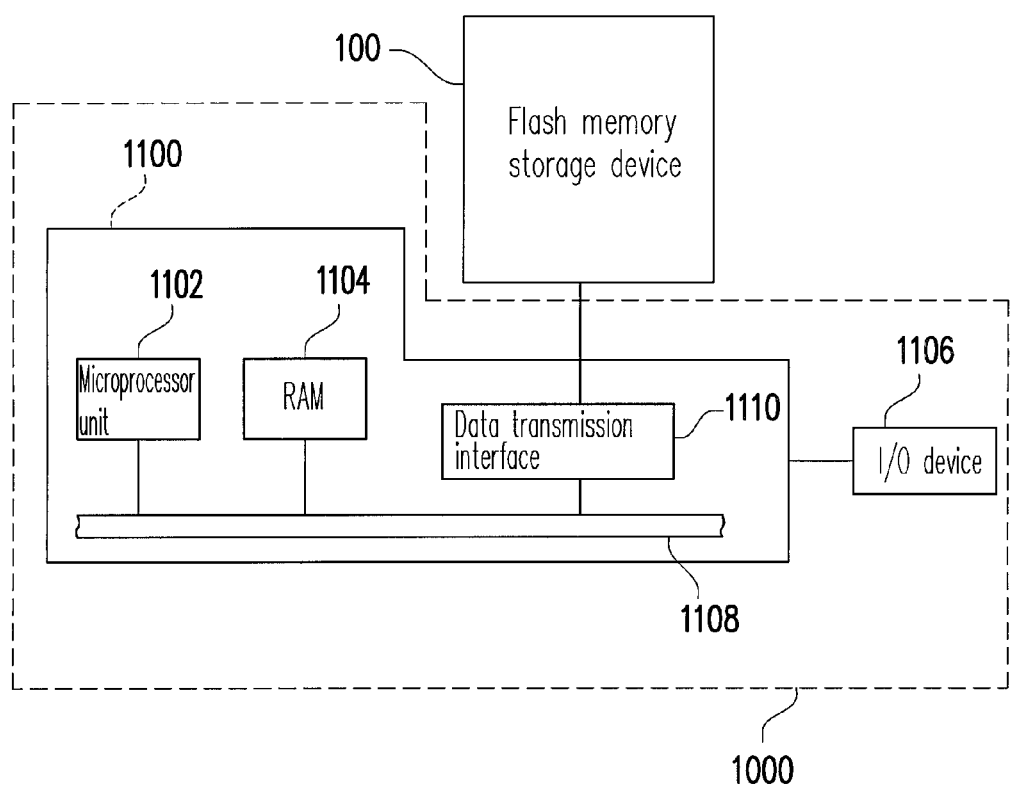
FIG. 1A is a schematic diagram showing a host system using a flash memory storage apparatus according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Flash memory storage apparatus (i.e., a flash memory storage system), typically, includes a flash memory chip and a controller (i.e., a control circuit). The flash memory storage device is usually used together with a host system so that the host system can write data into or read data from the flash memory storage device. In addition, a flash memory storage device also includes an embedded flash memory and a software that can be executed by a host system and substantially served as a controller of the embedded flash memory.

FIG. 1A is a schematic diagram showing a host system using a flash memory storage apparatus according to one embodiment of the present invention.

Figure 1B:
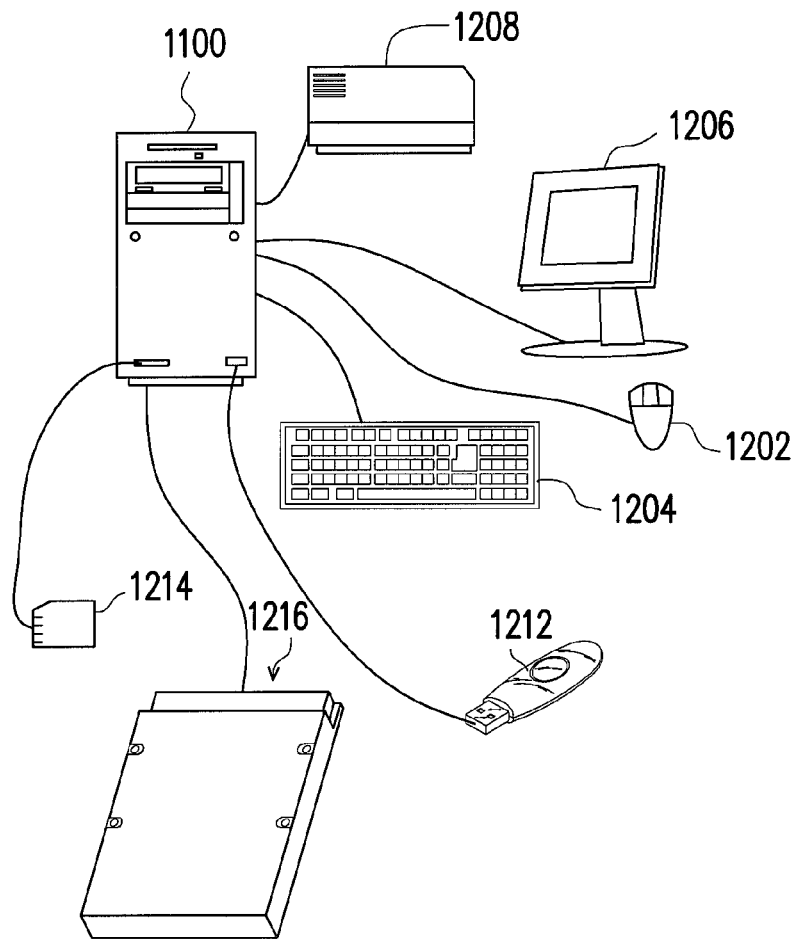
FIG. 1B is a diagram illustrating a computer, an input/output (I/O) device, and a flash memory storage apparatus according to an exemplary embodiment of the invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the scope of the I/O device 1106, and the I/O device 1106 may further include other devices.

In the embodiment of the present invention, the flash memory storage apparatus 100 is coupled to the devices of the host system 1000 through the data transmission interface 1110. By using the microprocessor 1102, the random access memory (RAM) 1104 and the Input/Output (I/O) device 1106, the data can be write into the flash memory storage apparatus 100 or can be read from the flash memory storage apparatus 100. The flash memory storage apparatus 100 may be a flash drive 1212, a memory card 1214, or a solid state drive (SSD) 1216, as shown in FIG. 1B.

Figure 1C:
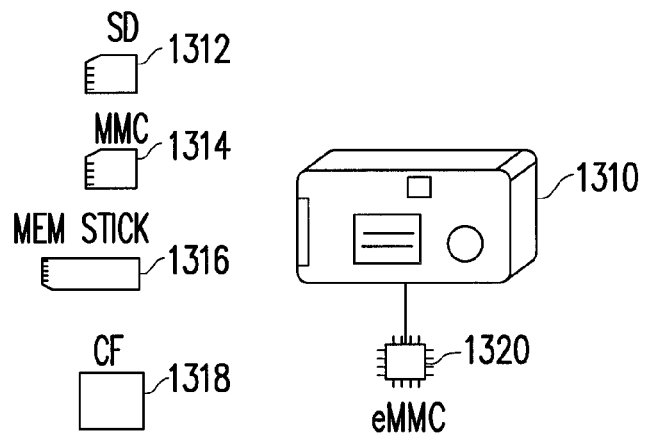
FIG. 1C is a diagram illustrating a host system and a flash memory storage apparatus according to another exemplary embodiment of the invention.

Generally, the host system 1000 substantially can be any system capable of storing data. Even though the host system 1000 is described as a computer system in the present exemplary embodiment, in another exemplary embodiment of the invention, the host system 1000 may also be a digital camera, a video camera, a communication device, an audio player, or a video player, and etc. For example, if the host system 1000 is a digital camera 1310, the flash memory storage apparatus 100 is then a SD card 1312, a MMC card 1314, a memory stick 1316, a CF card 1318, or an embedded storage device 1320 used in the digital camera 1310 (as shown in FIG. 1C) The embedded storage device 1320 includes an embedded MMC (eMMC). It should be mentioned that the eMMC is directly coupled to a substrate of the host system 1000.

Figure 2:
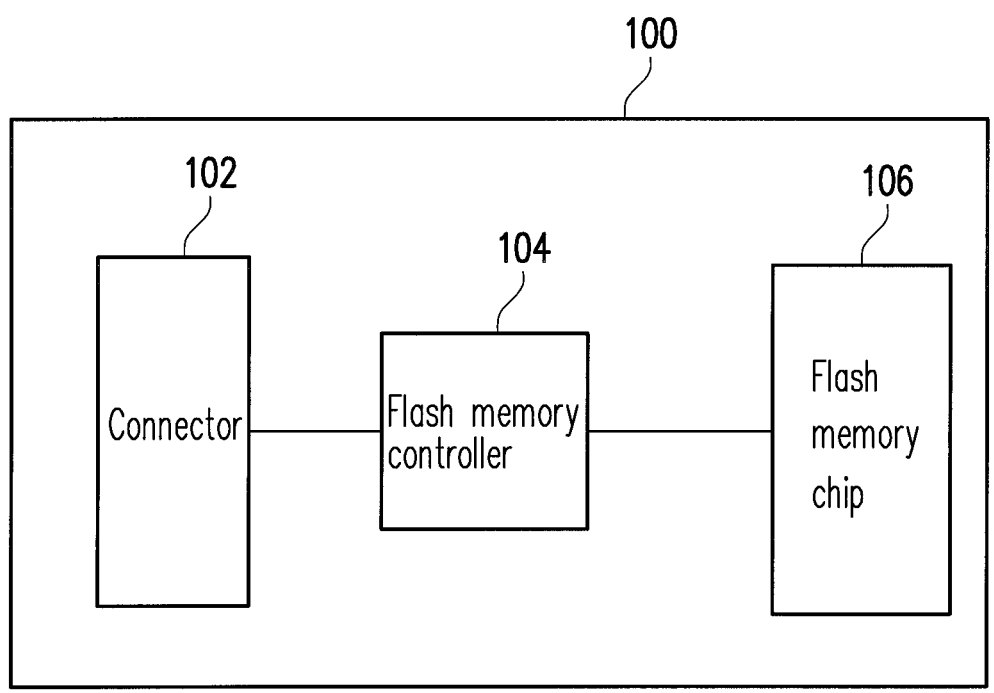
FIG. 2 is a detailed block diagram of the flash memory storage apparatus in FIG. 1A.

FIG. 2 is a detailed block diagram of the flash memory storage apparatus in FIG. 1A.

Referring to FIG. 2, the flash memory storage apparatus 100 includes a connector 102, a flash memory controller 104, and a flash memory chip 106.

The connector 102 is coupled to the flash memory controller 104 and used for coupling to the host system 1000. In the present embodiment, the connector 102 is a secure digital (SD) interface connector. However, it should be noticed that the present invention is not limited thereto and the connector 102 also can be a universal serial bus (USB) connector, an institute-of-electrical-and-electronic-engineers (IEEE) 1394 connector, a peripheral-component Interconnect-express (PCI Express) connector, a serial advanced technology attachment (SATA) connector, a memory stick (MS) interface connector, a multi-media-card (MMC) interface connector, a compact flash (CF) interface connector, an integrated-device-electronics (IDE) connector or other suitable type of connectors.

The flash memory controller 104 executes a plurality of logic gates or control commands implemented in a hardware form or a firmware form and performs various data operations such as data writing, reading, and erasing in the flash memory chip 106 according to commands of the host system 1000.

Figure 3:
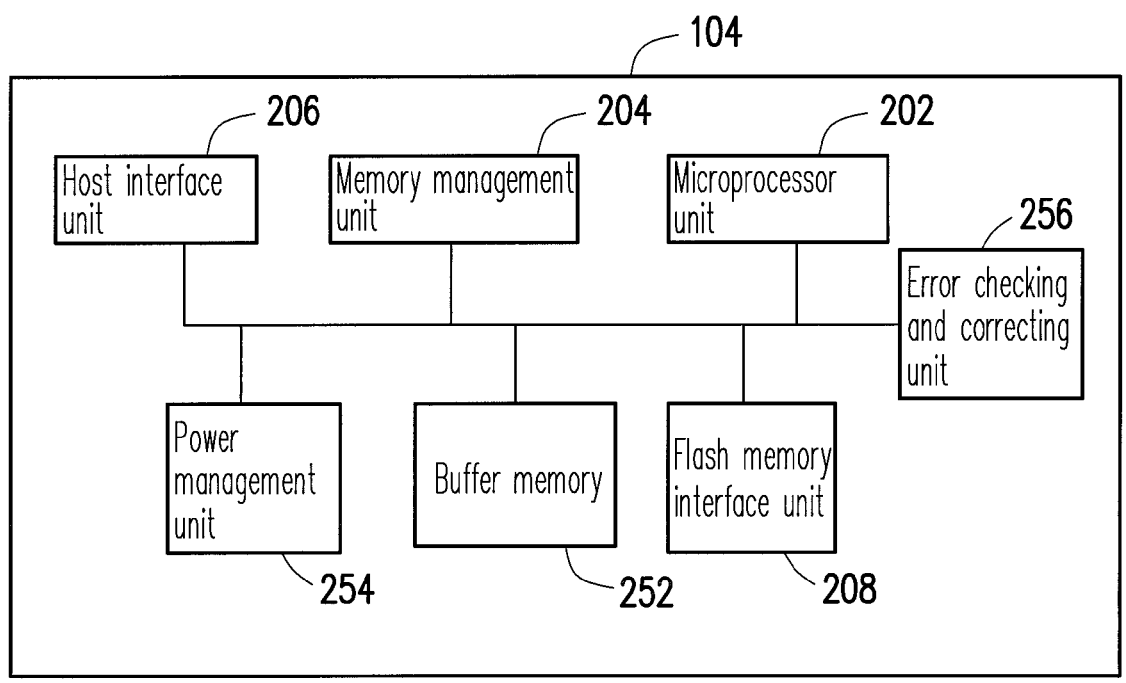
FIG. 3 is a schematic block diagram of a flash memory controller according to one exemplary embodiment of the invention.

FIG. 3 is a schematic block diagram of a flash memory controller according to one exemplary embodiment of the invention.

Referring to FIG. 3, the flash memory controller 104 includes a microprocessor unit 202, a memory management unit 204, a host interface unit 206 and a flash memory interface unit 208.

The microprocessor unit 202 is a main control unit of the flash memory controller 104. The microprocessor unit 202 cooperates with the memory management unit 204, the host interface unit 206, and the flash memory interface unit 208 to carry out various operations of the flash memory storage apparatus 100.

The memory management unit 204 is coupled to the microprocessor unit 202, and configured for be operated with the microprocessor unit 202 to perform a data access mechanism and a block management mechanism according to the present exemplary embodiment. Below, the data access mechanism and the block management mechanism will be described in detail with reference to accompanying drawings.

In the present exemplary embodiment, the memory management unit 204 is implemented in the flash memory controller 104 in a firmware form. For example, the memory management unit 204 including a plurality of control instructions is burned into a program memory (for example, a read only memory (ROM)), and the program memory is embedded into the flash memory controller 104. When the flash memory storage apparatus 100 is in operation, the control instructions of the memory management unit 204 are executed by the microprocessor unit 202 to accomplish the data access mechanism and the block management mechanism according to the present exemplary embodiment.

In another exemplary embodiment of the invention, the control commands of the memory management unit 204 are stored in a specific area (for example, the system area of a flash memory chip exclusively used for storing system data) of the flash memory chip 106 as program codes. Additionally, the memory management unit 204 may have a read only memory and a random access memory. And, the read only memory has a driver code, and the microprocessor unit 202 executes the driver code to load the control instructions of the memory management unit 204 stored in the flash memory chip 106 into the random access memory of the memory management unit 204, and then accomplish the data access mechanism and the block management mechanism according to the present exemplary embodiment based on the control instructions. In addition, in yet another exemplary embodiment of the present invention, the memory management unit 204 may also be implemented in the flash memory controller 104 in a hardware form.

The host interface unit 206 is coupled to the microprocessor unit 202, and configured for receiving and identifying commands and data from the host system 1000. Namely, the commands and data from the host system 1000 are transmitted to the microprocessor unit 202 through the host interface unit 206. In the present exemplary embodiment, the host interface unit 206 is a SD interface corresponding to the connector 102. However, it should be understood that the invention is not limited thereto, and the host interface unit 210 can be a PATA interface, a USB interface, an IEEE 1394 interface, a PCI express interface, a SATA interface, a MS interface, a MMC interface, a CF interface, an IDE interface, or other suitable data transmission interfaces.

The flash memory interface unit 208 is coupled to the microprocessor unit 202 and configured for accessing the flash memory chip 106. Namely, data to be written into the flash memory chip 106 is converted by the flash memory interface unit 208 into a format acceptable to the flash memory chip 106.

In another exemplary embodiment of the invention, the flash memory controller still includes a buffer memory 252. The buffer memory 252 is coupled to the microprocessor unit 202 and configured to temporarily store data and commands from the host system 1000 or data from the flash memory chip 106.

In another exemplary embodiment of the invention, the flash memory controller still includes a power management unit 254. The power management unit 254 is coupled to the microprocessor unit 202, and configured to control the power supply of the flash memory storage apparatus 100.

In another exemplary embodiment of the invention, the flash memory controller still includes an error checking and correcting unit 256. The error checking and correcting unit 256 is coupled to the microprocessor unit 202, and configured for executing an error checking and correcting procedure to ensure data accuracy. To be specific, when the microprocessor unit 202 receives a write command from the host system 1000, the error checking and correcting unit 256 generates an error checking and correcting (ECC) code for the data corresponding to the write command, and the microprocessor unit 202 writes the data and the corresponding ECC code into the flash memory chip 106. Subsequently, when the microprocessor unit 202 reads the data from the flash memory chip 106, the microprocessor 202 simultaneously reads the corresponding ECC code, and the error correction unit 256 executes the error checking and correcting procedure on the data according to the ECC code.

Referring to FIG. 2 again, the flash memory chip 106 is coupled to the flash memory controller 104 and used for storing data. In flash memory designs, a smallest unit for erasing data is one physical block. That is to say, each physical block contains the least number of memories that are erased together. Each physical block has several physical addresses. In the present exemplary embodiment, one physical address is one physical page, but the present invention is not limited thereto. Generally, one physical page is the minimum unit for programming. In other words, each physical page is the smallest unit for writing data or reading data. Each physical page usually includes a user data bit area and a redundant bit area. The user data bit area is used for storing user data, and the redundant bit area is used for storing system data (for example, the ECC code). In the present exemplary embodiment, the flash memory chip 106 is a multi level cell (MLC) NAND flash memory chip. However, the present invention is not limited thereto, and the flash memory chip 106 may also be a single level cell (SLC) NAND flash memory chip.

FIGS. 4~8 are diagrams of managing a flash memory chip according to one exemplary embodiment of the present invention.

It should be understood that the terms used herein for describing the operations (for example, "get", "select", "replace", "group", and "alternate", etc) performed on the physical blocks of a flash memory refer to logical operations performed on these physical blocks. Namely, the physical blocks in the flash memory are only logically operated and the actual positions thereof are not changed.

Figure 4:
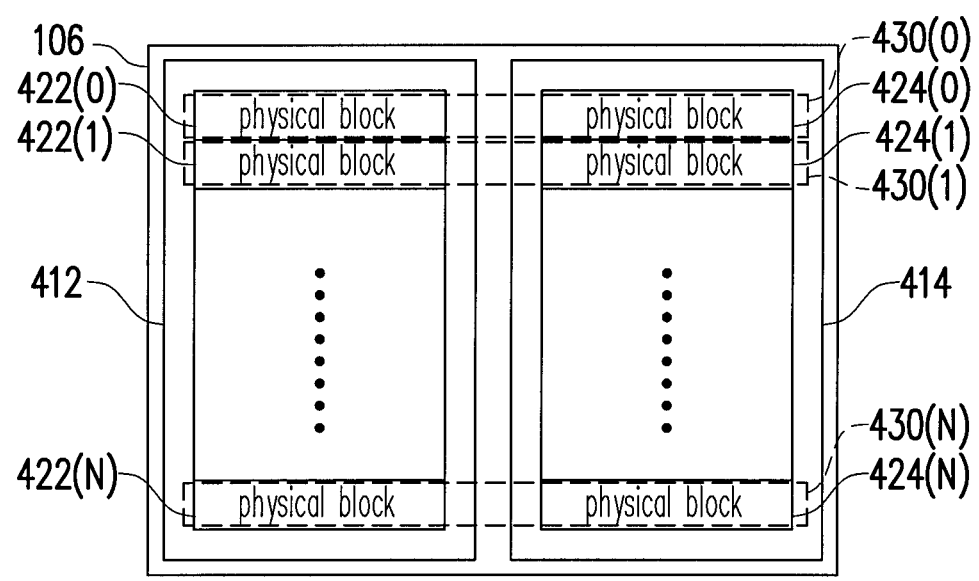
FIGS. 4~8 are diagrams of managing a flash memory chip according to one exemplary embodiment of the present invention.

Referring to FIG. 4, a flash memory chip system 106 have a first flash memory module 412 and a second flash memory module 414. The first flash memory module 412 has physical blocks 422-(0)~422-(N), and the second flash memory module 414 has physical blocks 424-(0)~424-(N). It is to be noted that even though the description of this exemplary embodiment is based on the example that the flash memory chip 106 is composed of 2 flash memory modules, but the present invention is not limited thereto.

In the exemplary embodiment, the number of the physical pages of each physical block is 128. However, it should be noticed that the present invention is not limited thereto and the number of the physical pages of each physical block may be 192, 256 or other suitable values. In addition, the physical blocks of the first flash memory module 412 and the second flash memory module 414 are usually grouped into a plurality of zones. By managing the physical blocks 422-(0)~422-(N) and the physical blocks 424-(0)~424-(N) by each individual zone, the operations for the physical blocks can be parallelized and the complexity of managing the physical blocks can be simplified.

Moreover, the microprocessor unit 202 of the flash memory controller 104 logically groups the physical blocks of the first flash memory module 412 and the second flash memory module 414 into a plurality of physical units for management. For example, one physical unit includes 2 physical blocks and one physical unit is used as a unit of erasing data. For example, the physical blocks 422-(0)~422-(N) and the physical blocks 424-(0)~424-(N) are logically grouped into physical units 430-(0)~430-(N). It should be understood that, in the present exemplary embodiment, the management is based on each physical unit having 2 physical blocks. However, the present invention is not limited thereto, and in another exemplary embodiment of the present invention, each physical unit may be composed of one or more physical blocks.

Figure 5:
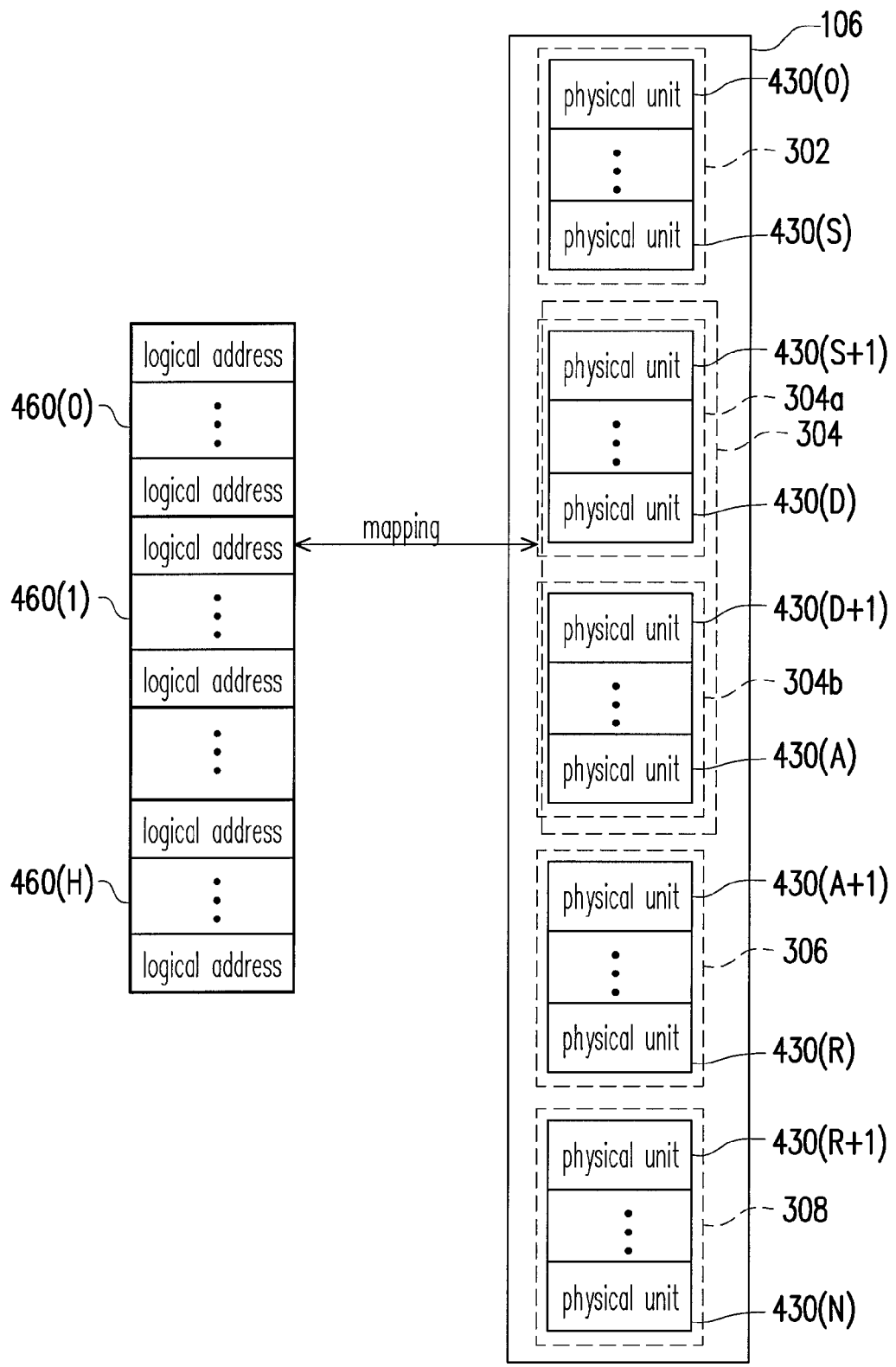

Referring to FIG. 5, the microprocessor unit 202 logically groups the physical units 430(0)~430(N) into a system area 302, a storage area 304, and a replacement area 306.

The physical units logically belonging to the system area 302 are used for recording system data, which includes information related to the manufacturer and a model of the flash memory chip, the number of the zones in each flash memory module, the number of the physical blocks in each zone, the number of the physical pages in each physical block, and so forth.

The physical units logically belonging to the storage area 304 are used for storing data written by the host system 1000. Namely, the flash memory storage apparatus 100 uses the physical units in the storage area 304 for actually storing data written by the host system 1000. In particular, in the exemplary embodiment, the microprocessor unit 202 groups the physical units in the storage area 304 into a data area 304a and a spare area 304b. The physical units logically belonging to the data area 304a are physical units mapped to logical units accessed by the host system 1000. That is, the physical units of the data area 304a are units which store valid data. And, the physical units of the spare area 304b are used for substituting the physical units of the data area. Hence, the physical units in the spare area 304b are either blank or available units (i.e., no data is recorded in these units or data recorded in these units is marked as invalid data). In other words, the physical units of the data area 304a and the spare area 304b are alternated to store the data written into the flash memory storage apparatus 100 by the host system 1000.

Figure 6:
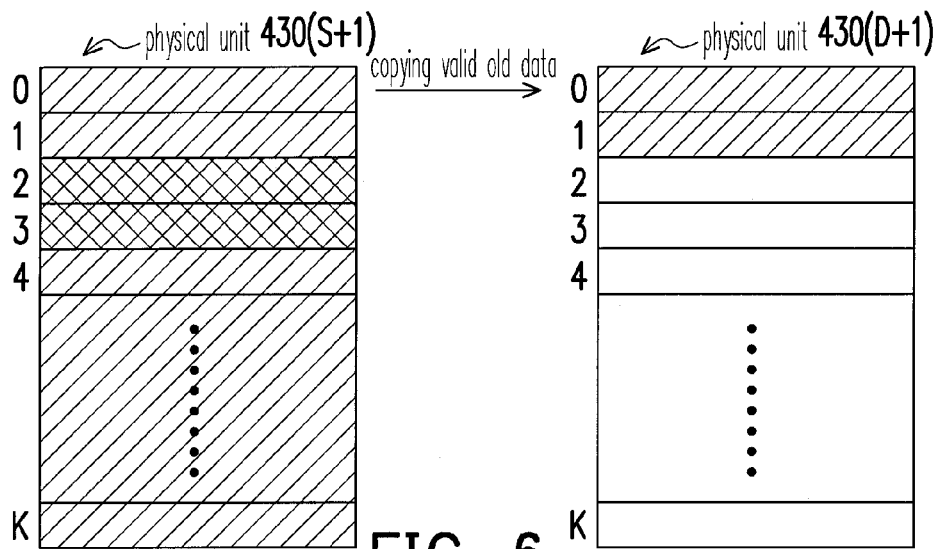
Figure 7:
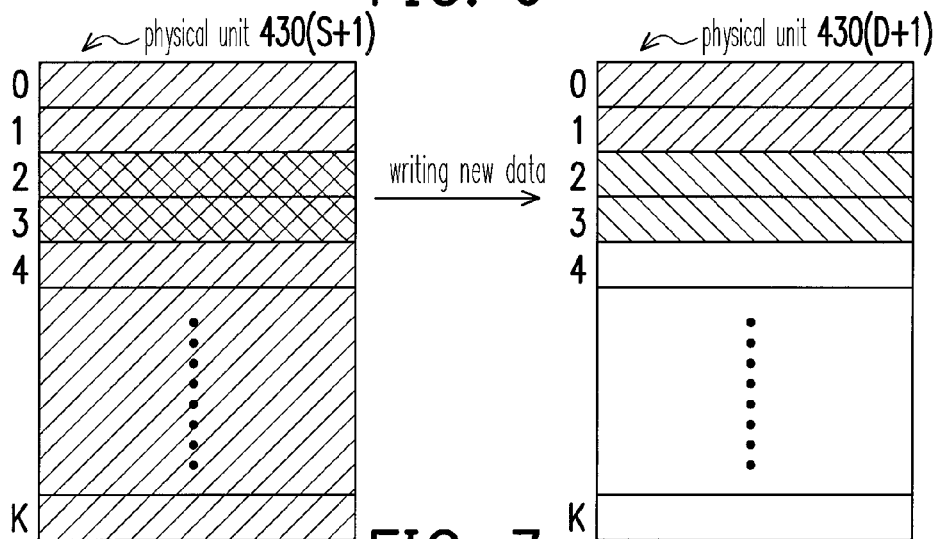
Figure 8:
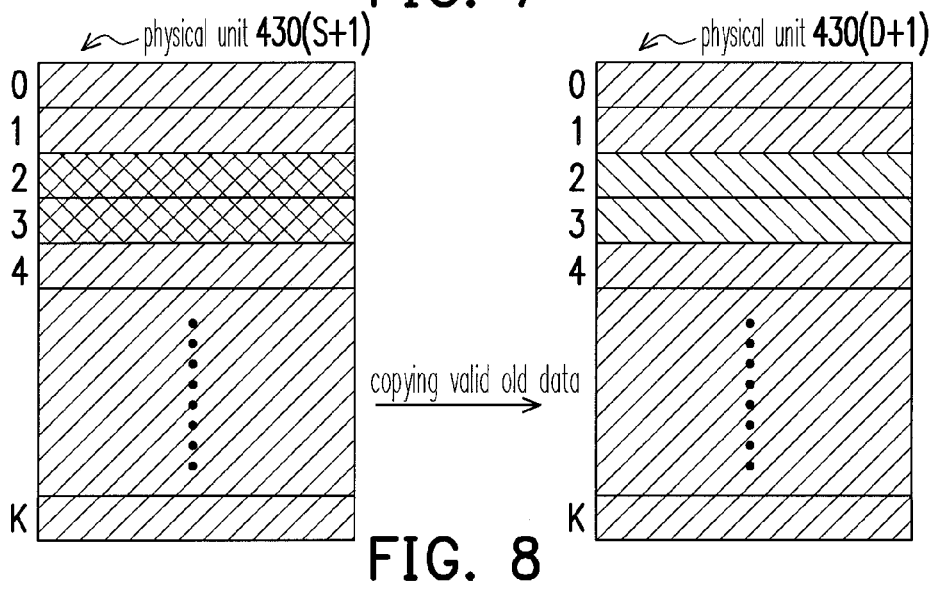

Referring to FIGS. 6~8, when the flash memory controller receives a write command from the host system 1000 and is about to write data into the physical unit 430(S+1) of the data area 304a, the microprocessor unit 202 gets the physical unit 430(D+1) as a substitute physical unit instead of the physical unit 430(S+1) of the data area 304a. However, the microprocessor unit 202 does not instantly move all the valid data of the physical unit 430(S+1) to the physical unit 430(D+1) and erase the physical unit 430(S+1) while the microprocessor unit 202 writes new data into the physical unit 430(D+1). To be specific, the microprocessor unit 202 copies the originally valid data stored in the physical addresses, smaller than the physical address for writing the new data in the physical block 430(S+1), i.e., the 0th physical address and the 1st physical address, to the physical block 430(D+1) (as shown in FIG. 6) and writes the new data into the physical block 430(D+1) (i.e., data stored in the 2nd physical address and the 3rd physical address shown in FIG. 7). At this time, the microprocessor unit 202 has completed the write command. Since the valid data in the physical unit 430(S+1) may become invalid in a next operation (for example, another write command), instantly moving all the valid data from the physical unit 430(S+1) to the physical unit 430(D+1) may be unnecessary. In the exemplary embodiment, the operation of temporarily keeping this temporary relationship (i.e., a relationship between the physical block 430(S+1) and the physical block 430(D+1)) is referred to as an "opened mother-child units state", and the original physical unit is referred as a "mother physical unit" and the substitute physical unit is referred as a "child physical unit".

Thereafter, when actually combining the contents of the physical unit 430(S+1) and the physical unit 430(D+1), the microprocessor unit 202 integrates the physical unit 430(S+1) with the physical unit 430(D+1) into one physical unit, and thereby enhances efficiency of use of the blocks. The operation of integrating is also called "closing mother-child units". For example, as shown in FIG. 8, when closing the mother-child units, the microprocessor unit 202 copies rest of the valid data (i.e., data stored in the 4th~Kth physical addresses) of the physical unit 430(S+1) to the substitute physical unit 430(D+1), and then erases the physical unit 430(S+1) and associates the physical unit 430(S+1) with the spare area 304b. Meanwhile, the physical unit 430(D+1) is associated with the data area 304a.

Referring to FIG. 5, in the exemplary embodiment, the physical units logically belonging to the replacement area 306 are replacement physical units. For example, when the flash memory chip 106 is manufactured in the factory, 4% of the physical units thereof could be reserved for replacement. Namely, when the physical units in the system area 302 and the storage area 304 are damaged, the physical units reserved in the replacement area 306 can be used for replacing the damaged physical units (i.e., bad units). Thus, if there are still normal physical units in the replacement area 306 and a physical unit is damaged, the microprocessor unit 202 gets a normal physical unit from the replacement area 306 for replacing the damaged physical unit. If there is no more normal physical unit in the replacement area 306 and a physical unit is damaged, the flash memory storage apparatus 100 is announced as being in a write-protect status and cannot be used for writing data anymore.

In particular, the numbers of the physical units in the system area 302, storage area 304 and replacement area 306 are various based on different flash memory chips. Additionally, it has to be understood that the grouping relationships of grouping the physical units into the system area 302, the storage area 304, and the replacement area 306 are dynamically changed during the operation of the flash memory storage apparatus 100. For example, when a physical unit in the storage area is damaged and replaced by a physical unit in the replacement area, the physical unit in the replacement area is associated with the storage area.

In the exemplary embodiment, logical addresses are configured for the host system 1000 to properly access data in the physical units storing data with the alternate mechanism. Additionally, the microprocessor unit 202 groups the logical addresses into logical units 460(0)~460(H) and maps the logical units 460(0)~460(H) to the physical blocks of the data area 304a (as shown in FIG. 5).

For example, in a case where the logical unit 460(0) maps to the physical unit 430(S+1), when the host system 1000 is about to write data into logical addresses belonging to the logical unit 460(0), the microprocessor unit 202 identifies the logical unit 460(0) that the logical addresses belong to according to a configuration unit (not shown) or a mathematic operation formula. After that, the microprocessor unit 202 identifies the physical unit 430(S+1) mapped to the logical unit 460(0) according to a logical unit-physical unit mapping table, gets the physical unit 430(D+1) from the spare area 304b, and writes the valid data in the physical unit 430(S+1) and data written by the host system 1000 into the physical unit 430(D+1). Then, the microprocessor unit 202 updates the logical unit-physical unit mapping table to re-map the logical unit 460(0) to the physical unit 430(D+1). In particular, when a physical unit mapped to a logical unit is at the opened mother-child units state, the microprocessor unit 202 marks that the logical unit is at the opened mother-child units state.

Besides the general writing operation (as shown in FIGS. 6~8), the microprocessor unit 202 groups at portion of the physical units into a global random area 308, and temporarily stores small data written by the host system 1000 in the physical units of the global random area 308. Herein, the physical units of the global random area 308 are also referred as "global random physical units (GR physical units)". Then, the microprocessor unit 202 writes the data temporarily stored in the global random area 308 into a physical unit of the data area 304a according to the corresponding logical unit when the flash memory storage apparatus 100 is at an idle state (e.g., the flash memory storage apparatus 100 does not executes any commands from the host system 1000). Accordingly, the number of moving valid data can effectively be reduced and thus the efficiency of writing data can be increased. Herein, when the size of data written by the host system 1000 is smaller than or equal to the capacity of one physical address (i.e., one physical page), the microprocessor unit 202 considers the data as "small data". For example, if it is assumed that the capacity of each physical address is 8 kilobytes, the microprocessor unit 202 considers data that is smaller than or equal to 8 kilobytes as the "small data".

To be specific, the microprocessor unit 202 groups the logical units 460(0)~460(H) into a plurality of logical unit groups and respectively configures global random physical units for the logical unit groups.

Figure 9:
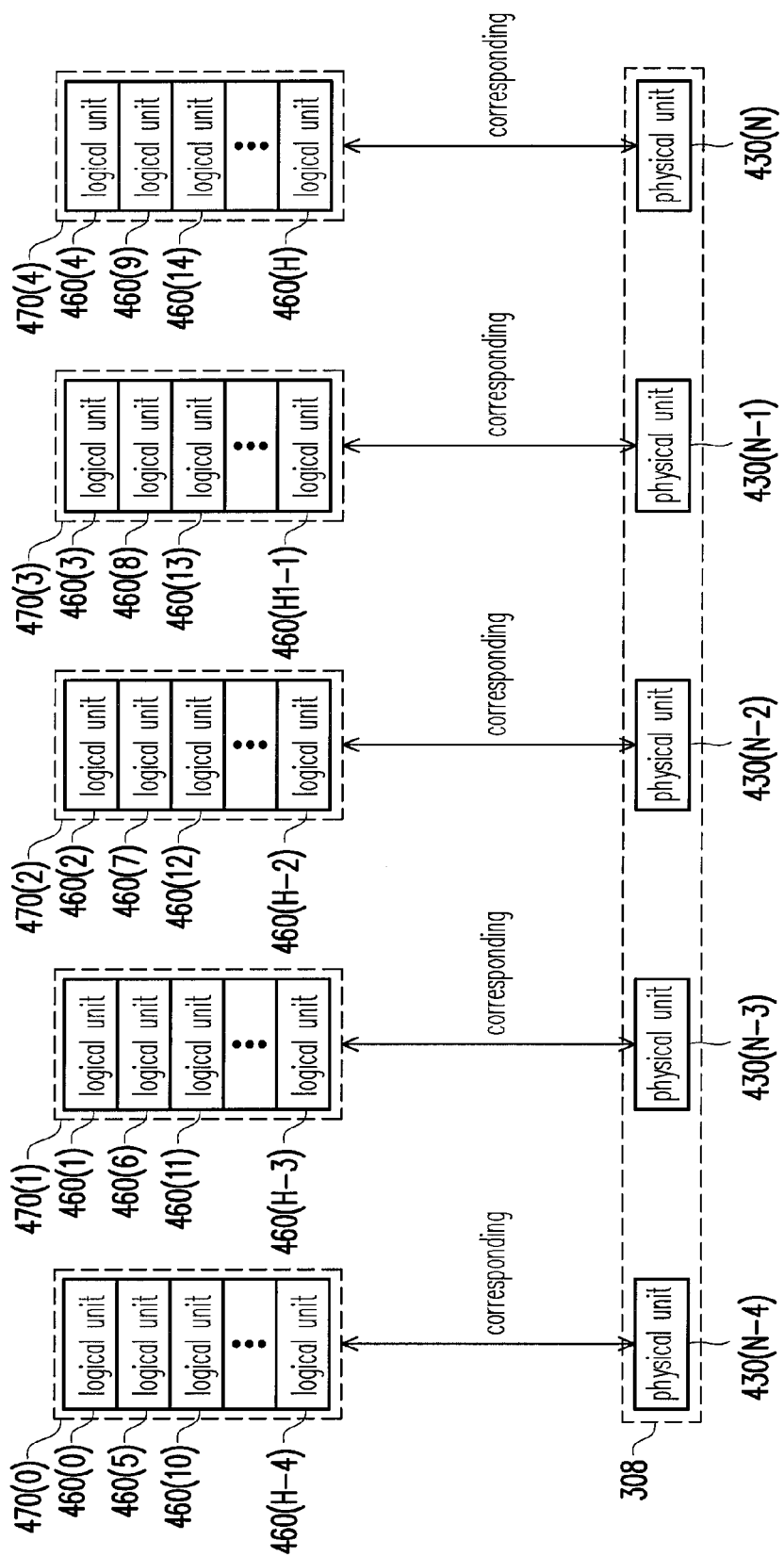
FIG. 9 is a diagram illustrating an example of configuring logical units and global random physical units according to one exemplary embodiment of the present invention.

FIG. 9 is a diagram illustrating an example of configuring logical units and GR physical units according to one exemplary embodiment of the present invention.

Referring to FIG. 9, it is assumed that the logical units are grouped into 5 logical unit groups. The logical units 460(0), 460(5), 460(10) . . . 460(H-4) are grouped as the logical unit group 470(0) and the physical unit 430(N-4) is configured as a first GR physical unit corresponding to the logical unit group 470(0). The logical units 460(1), 460(6), 460(11) . . . 460(H-3) are grouped as the logical unit group 470(1) and the physical unit 430(N-3) is configured as a second GR physical unit corresponding to the logical unit group 470(1). The logical units 460(2), 460(7), 460(12) . . . 460(H-2) are grouped as the logical unit group 470(2) and the physical unit 430(N-2) is configured as a third GR physical unit corresponding to the logical unit group 470(2). The logical units 460(3), 460(8), 460(13) . . . 460(H-1) are grouped as the logical unit group 470(3) and the physical unit 430(N-1) is configured as a fourth GR physical unit corresponding to the logical unit group 470(3). The logical units 460(4), 460(9), 460(14) . . . 460(H) are grouped as the logical unit group 470(4) and the physical unit 430(N) is configured as a fifth GR physical unit corresponding to the logical unit group 470(4). Additionally, small data that is written to the logical units 460(0), 460(5), 460(10) . . . 460(H-4) by the host system 1000 is temporarily stored in the first GR physical unit 430(N-4) by the microprocessor unit 202. Small data that is written to the logical units 460(1), 460(6), 460(11) . . . 460(H-3) by the host system 1000 is temporarily stored in the second GR physical unit 430(N-3) by the microprocessor unit 202. Small data that is written to the logical units 460(2), 460(7), 460(12) . . . 460 (H-2) by the host system 1000 is temporarily stored in the third GR physical unit 430(N-2) by the microprocessor unit 202. Small data that is written to the logical units 460(3), 460(8), 460(13) . . . 460(H-1) by the host system 1000 is temporarily stored in the fourth GR physical unit 430(N-1) by the microprocessor unit 202. And, small data that is written to the logical units 460(4), 460(9), 460(14) . . . 460(H) by the host system 1000 is temporarily stored in the third GR physical unit 430(N) by the microprocessor unit 202.

For example, in a case where the host system 1000 stores small data in the logical unit 460(0) and the logical unit 460(0) currently maps to the physical unit 430(S+1), when the host system 1000 gives a write command to write first data that is small data in the logical unit 460(0), the microprocessor unit 202 determines whether the logical unit 460(0) is at the opened mother-child units state. If the logical unit 460(0) is not at the opened mother-child units state, the microprocessor unit 202 temporarily stores the first data in the GR physical unit 430(N-4) corresponding to the logical unit group 470(0) that the logical unit 460(0) belongs to.

In particular, if the host system 1000 frequently writes small data into the logical units 460(0), 460(5), 460(10) . . . 460(H-4) and the GR physical unit 430(N-4) corresponding to the logical unit group 470(0) is full with data, the microprocessor unit 202 gets a physical unit (e.g., the physical unit 430(D+4)) as a global random substitute physical unit (GRS physical unit) corresponding to the GR physical unit 430(N-4) and temporarily stores small data belonging to the logical units 460(0), 460(5), 460(10) . . . 460(H-4) in the GRS physical unit 430(D+4). It should be mentioned that in a case where a GRS physical unit corresponding to a GR physical unit is also full with data, if there are enough physical units in the spare area 304b, the microprocessor unit 202 may get one physical unit again from the spare area 304b as another GRS physical unit corresponding to the GR physical unit. That is, one GR physical unit may correspond to a plurality of GRS physical units.

In the exemplary embodiment, after data temporarily stored in the global random area 308 is written into the physical units of the data area 304a, the microprocessor unit 202 marks the data temporarily stored in the GR physical unit or the GRS physical unit as "invalid data". Particularly, when all data temporarily stored in a GR physical unit is marked as the "invalid data", the microprocessor unit 202 performs an erasing operation on the GR physical unit to erase storage space of the GR physical unit for storing subsequent small data written by the host system 1000. For example, after a physical unit used as a GR physical unit is erased, the erased physical unit is associated with the spare area 304b and microprocessor unit 202 gets another physical unit from the spare area 304b as the GR physical unit. Additionally, when all data temporarily stored in a GRS physical unit is marked as the "invalid data", the microprocessor unit 202 performs an erasing operation on the GRS physical unit and associates the erased physical unit with the spare area 304b.

It should be mentioned that in the exemplary embodiment, the microprocessor unit 202 performs a wear-leveling procedure to level the wear of the physical units belonging to the data area 304a and the spare area 304b. Accordingly, the lifespan of the flash memory storage apparatus 100 is prolonged. Therefore, the mechanism that the microprocessor unit 202 gets physical units from the spare area 304b as the GR physical units and the GRS physical units and associates the erased GR physical units and the erased GRS physical units with the spare area 304b is capable of making the physical units of the storage area 304 to alternately map to the logical units and be as the GR physical units and the GRS physical units, such that the wear of the physical units is more uniform.

Additionally, it should be mentioned that in the exemplary embodiment the microprocessor unit 202 gets physical units from the spare area 304b as the GR physical units. However, the present invention is not limited thereto, and in another exemplary embodiment of the present invention, the microprocessor unit 202 may configure additional physical units in the global random area 308 and use the additional physical units as the GR physical units.

Figure 10:
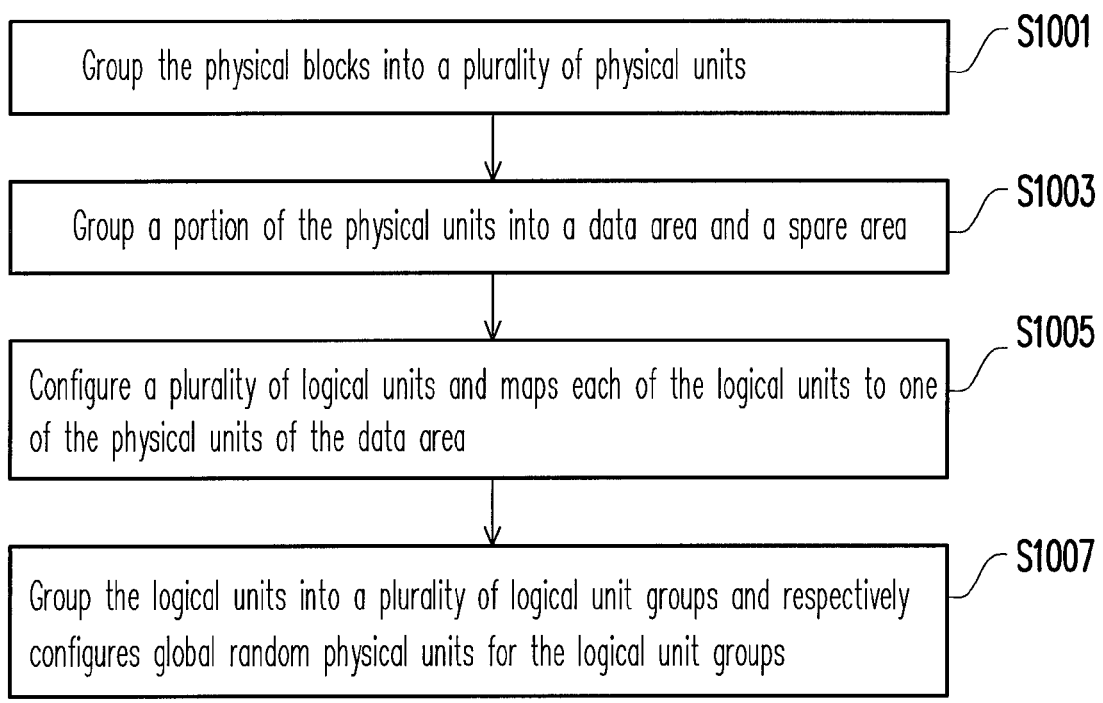
FIG. 10 is a flow chart illustrating a block management method according to one exemplary embodiment of the present invention.

FIG. 10 is a flow chart illustrating a block management method according to one exemplary embodiment of the present invention.

Referring to FIG. 10, in step S1001, the microprocessor unit 202 groups the physical blocks into a plurality of physical units, and in step S1003, the microprocessor unit 202 groups a portion of the physical units into a data area and a spare area (as shown in FIG. 4 and FIG. 5).

In step S1005, the microprocessor unit 202 configures a plurality of logical units and maps each of the logical units to one of the physical units of the data area (as shown FIG. 5). After that, in step S1007, the microprocessor unit 202 groups the logical units into a plurality of logical unit groups and respectively configures GR physical units for the logical unit groups (as shown in FIG. 9).

Figure 11:
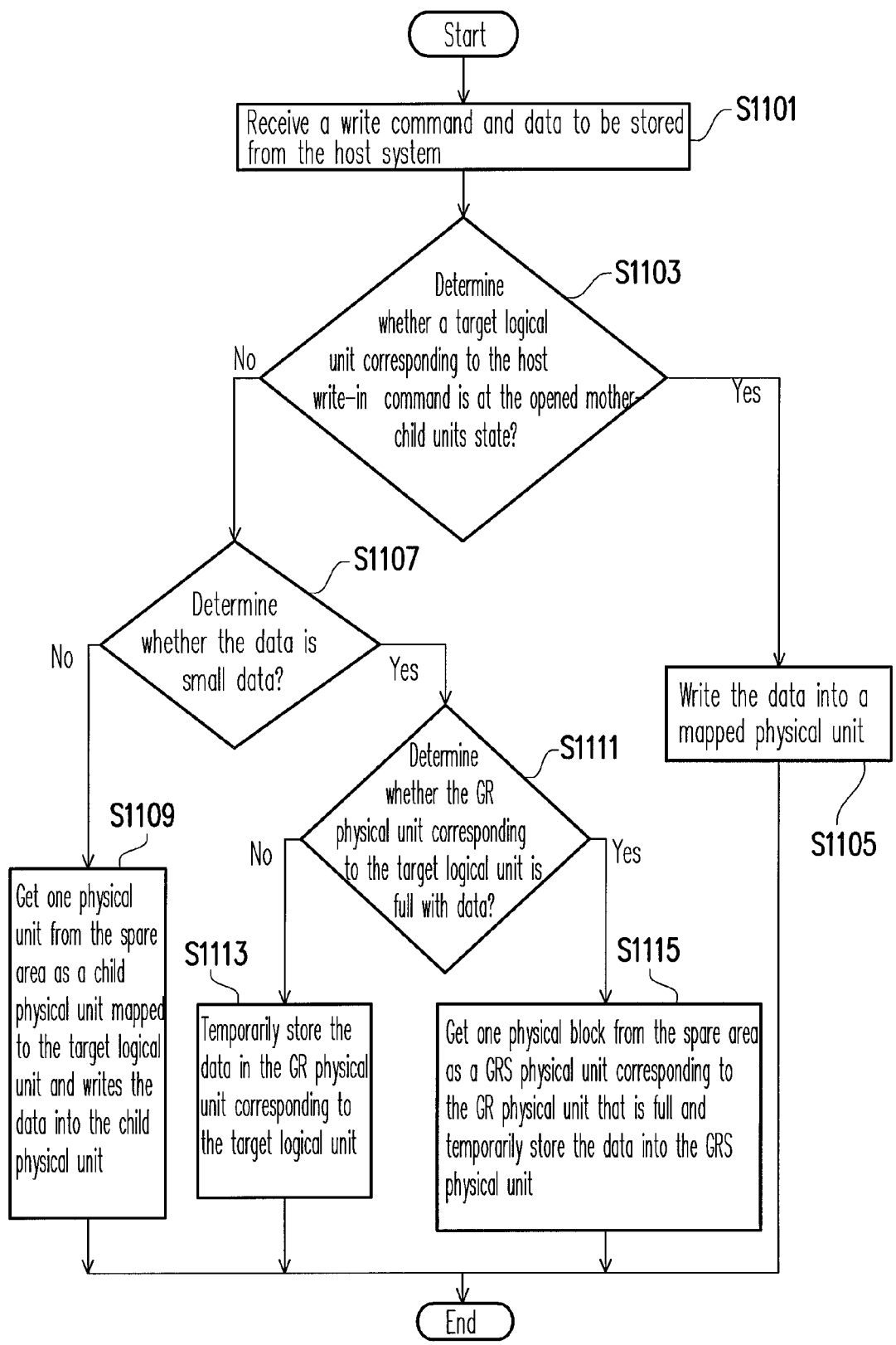
FIG. 11 is a flowchart illustrating a data writing method according to one exemplary embodiment of the present invention.

FIG. 11 is a flowchart illustrating a data writing method according to one exemplary embodiment of the present invention.

Referring to FIG. 11, in step S1101, the microprocessor unit 202 receives a write command and data to be stored from the host system 1000. Then, in step S1103, the microprocessor unit 202 determines whether a logical unit (referred as a "target logical unit" hereafter) corresponding to the write command is at the opened mother-child units state.

If in step S1103, it is determined that the target logical unit is at the opened mother-child units state, the microprocessor unit 202 writes the data into a mapped physical unit (S1105). To be specific, the microprocessor unit 202 writes the data into the mapped physical unit according to the logical unit-physical unit mapping table. If in step S1103, it is determined that the target logical unit is not at the opened mother-child units state, the microprocessor unit 202 determines whether the data is small data (S1107).

If the data is not small data, then in step S1109, the microprocessor unit 202 gets one physical unit from the spare area 304b as a child physical unit mapped to the target logical unit and writes the data into the child physical unit (as shown in FIG. 6 and FIG. 7). If in step S1107, it is determined that the data is small data, the microprocessor unit 202 determines whether the GR physical unit corresponding to the target logical unit is full with data (S1111).

If it is determined that the GR physical unit corresponding to the target logical unit is not full with data, the microprocessor unit 202 temporarily stores the data in the GR physical unit corresponding to the target logical unit (S1113). If it is determined that the GR physical unit corresponding to the target logical unit is full with data, then in step S1115, the microprocessor unit 202 gets one physical block from the spare area 304b as a GRS physical unit corresponding to the GR physical unit that is full and temporarily stores the data into the GRS physical unit.

As described above, the exemplary embodiment of the present invention configures GR physical units for storing small data, thereby reducing the number of times for moving valid data and shortening the time for executing a write command. Additionally, the exemplary embodiment of the present invention configures GRS physical units for substituting the GR physical units to store small data, thereby reducing the number of times for organizing valid data and further shortening the time for executing a write command. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data writing method, for writing data from a host system into a plurality of physical blocks of a flash memory chip, the data writing method comprising:

grouping the physical blocks into a plurality of physical units;

grouping a portion of the physical units into a data area and a spare area;

configuring a plurality of logical units, wherein each of the logical units maps one of the physical units of the data area;

grouping the logical units into a plurality of logical unit groups;

configuring another portion of the physical units as a plurality of global random physical units corresponding to the logical unit groups, wherein each of the global random physical units corresponds to one of the logical unit groups;

receiving first data, wherein the first data corresponds to a first logical unit among the logical units, the first logical unit belongs to a first logical unit group among the logical unit groups and a first global random physical unit among the global random physical units corresponds to the first logical unit group;

determining whether the first data is small data and whether the first logical unit is at an opened mother-child unit state;

getting a physical unit from the physical units of the spare area as a child physical unit of the physical unit mapped to the first logical unit and writing the first data into the child physical unit when the first data is not the small data and the first logical unit is not at the opened mother-child unit state;
writing the first data into the child physical unit of the physical unit mapped the first logical unit when the first logical unit is at the opened mother-child unit state;
determining whether the first global random physical unit is full when the first data is the small data and the first logical unit is not at the opened mother-child unit state;
getting a physical unit from the physical units of the spare area as a first global random substitute physical unit for substituting the first global random physical unit and temporarily storing the first data into the first global random substitute physical unit when the first global random physical unit is full; and
temporarily storing the first data into the first global random physical unit when the first global random physical unit is not full,
wherein the child physical unit for substituting the physical unit mapped to the first logical unit is written only with data belonging to the first logical unit, and the first global random physical unit and the first global random substitute physical unit are written with data belonging to a plurality of logical units of the first logical unit group.

2. The data writing method according to claim 1 further comprising:
determining whether all data temporarily stored in the first global random physical unit or the first global random substitute physical unit is invalid; and performing an erasing operation on the first global random physical unit or the first global random substitute physical unit when all the data temporarily stored in the first global random physical unit or the first global random substitute physical unit is invalid.

3. A flash memory controller, for managing a plurality of physical blocks of a flash memory chip, the flash memory controller comprising:
a microprocessor unit;
a flash memory interface unit, coupled to the microprocessor unit, and configured to couple to the flash memory chip;
a host interface unit, coupled to the microprocessor unit and configured to couple to the host system; and
a memory management unit, coupled to the microprocessor unit and has a plurality of program codes for providing to the microprocessor unit to perform a plurality of procedures, wherein the procedures comprise:
grouping the physical blocks into a plurality of physical units, and grouping a portion of the physical units into a data area and a spare area;
configuring a plurality of logical units, wherein each of the logical units maps one of the physical units of the data area;
grouping the logical units into a plurality of logical unit groups and configuring another portion of the physical units as a plurality of global random physical units corresponding to the logical unit groups, wherein each of the global random physical units corresponds to one of the logical unit groups;
receiving first data, wherein the first data corresponds to a first logical unit among the logical units, the first logical unit belongs to a first logical unit group among the logical unit groups and a first global random physical unit among the global random physical units corresponds to the first logical unit group;
determining whether the first data is small data and whether the first logical unit is at an opened mother-child unit state;
getting a physical unit from the physical units of the spare area as a child physical unit of the physical unit mapped to the first logical unit and writing the first data into the child physical unit when the first data is not the small data and the first logical unit is not at the opened mother-child unit state;
writing the first data into the child physical unit of the physical unit mapped the first logical unit when the first logical unit is at the opened mother-child unit state;
determining whether the first global random physical unit is full when the first data is the small data and the first logical unit is not at the opened mother-child unit state;
getting a physical unit from the physical units of the spare area as a first global random substitute physical unit for substituting the first global random physical unit and temporarily storing the first data into the first global random substitute physical unit when the first global random physical unit is full; and
temporarily storing the first data into the first global random physical unit when the first global random physical unit is not full,
wherein the child physical unit for substituting the physical unit mapped to the first logical unit is written only with data belonging to the first logical unit, and the first global random physical unit and the first global random substitute physical unit are written with data belonging to a plurality of logical units of the first logical unit group.

4. The flash memory controller according to claim 3, wherein the microprocessor unit is further operative to determine whether all data temporarily stored in the first global random physical unit or the first global random substitute physical unit is invalid; and perform an erasing operation on the first global random physical unit or the first global random substitute physical unit when all the data temporarily stored in the first global random physical unit or the first global random substitute physical unit is invalid.

5. A flash memory storage system, comprising:
a flash memory chip, having a plurality of physical blocks;
a connector, configured to couple to a host system; and
a flash memory controller, coupled to the flash memory chip and the connector and configured to perform a plurality of procedures, wherein the procedures comprise:
grouping the physical blocks into a plurality of physical units, and grouping a portion of the physical units into a data area and a spare area;
configuring a plurality of logical units, wherein each of the logical units maps one of the physical units of the data area;
grouping the logical units into a plurality of logical unit groups and configuring another portion of the physical units as a plurality of global random physical units corresponding to the logical unit groups, wherein each of the global random physical units corresponds to one of the logical unit groups;
receiving first data, wherein the first data corresponds to a first logical unit among the logical units, the first logical unit belongs to a first logical unit group among the logical unit groups and a first global random physical unit among the global random physical units corresponds to the first logical unit group;

determining whether the first data is small data and whether the first logical unit is at an opened mother-child unit state;

getting a physical unit from the physical units of the spare area as a child physical unit of the physical unit mapped to the first logical unit and writing the first data into the child physical unit when the first data is not the small data and the first logical unit is not at the opened mother-child unit state;

writing the first data into the child physical unit of the physical unit mapped the first logical unit when the first logical unit is at the opened mother-child unit state;

determining whether the first global random physical unit is full when the first data is the small data and the first logical unit is not at the opened mother-child unit state;

getting a physical unit from the physical units of the spare area as a first global random substitute physical unit for substituting the first global random physical unit and temporarily storing the first data into the first global random substitute physical unit when the first global random physical unit is full; and temporarily storing the first data into the first global random physical unit when the first global random physical unit is not full, wherein the child physical unit for substituting the physical unit mapped to the first logical unit is written only with data belonging to the first logical unit, and the first global random physical unit and the first global random substitute physical unit are written with data belonging to a plurality of logical units of the first logical unit group.

6. The flash memory storage system according to claim 5, wherein the flash memory controller is further operative to determine whether all data temporarily stored in the first global random physical unit or the first global random substitute physical unit is invalid, wherein the flash memory controller is further operative to perform an erasing operation on the first global random physical unit or the first global random substitute physical unit when all the data temporarily stored in the first global random physical unit or the first global random substitute physical unit is invalid.

* * * * *